US012193589B2

(12) United States Patent
Lei et al.

(10) Patent No.: US 12,193,589 B2
(45) Date of Patent: Jan. 14, 2025

(54) MOUNTING DEVICE FOR A CURTAIN

(71) Applicant: Leafy Windoware Co., Ltd., Dongguan (CN)

(72) Inventors: Zhenbang Lei, Dongguan (CN); Xingbang Lei, Dongguan (CN)

(73) Assignee: Leafy Windoware Co., Ltd., Dongguan (CN)

( * ) Notice: Subject to any disclaimer, the term of this patent is extended or adjusted under 35 U.S.C. 154(b) by 35 days.

(21) Appl. No.: 18/139,950

(22) Filed: Apr. 27, 2023

(65) Prior Publication Data

US 2024/0197100 A1 Jun. 20, 2024

(30) Foreign Application Priority Data

Dec. 19, 2022 (CN) .............................. 202211634412

(51) Int. Cl.
 *A47H 1/142* (2006.01)
(52) U.S. Cl.
 CPC ................................... *A47H 1/142* (2013.01)
(58) Field of Classification Search
 CPC .................................. A47H 1/142; E06B 9/42
 See application file for complete search history.

(56) References Cited

U.S. PATENT DOCUMENTS

| | | | |
|---|---|---|---|
| 7,703,500 B2* | 4/2010 | Wen ........................ | E06B 9/323 248/254 |
| 2015/0300085 A1* | 10/2015 | Klein Tuente ......... | A47H 1/142 248/267 |
| 2017/0081916 A1* | 3/2017 | Greening .................. | E06B 9/42 |
| 2018/0112462 A1* | 4/2018 | Chen ......................... | E06B 9/42 |
| 2018/0179816 A1* | 6/2018 | Cheng ....................... | E06B 9/82 |
| 2019/0249488 A1* | 8/2019 | Campagna ................ | E06B 9/48 |
| 2023/0112345 A1* | 4/2023 | Menendez ................ | E06B 9/44 160/310 |

\* cited by examiner

*Primary Examiner* — Anita M King (57) ABSTRACT

A mounting device for a curtain includes a bracket, an adapter mounted to the bracket for connecting the curtain, and a cover forming an abutting block and slidably mounted to the bracket, to cover the adapter. The bracket forms a first insertion portion and defines an engaging hole. The adapter forms a second insertion portion, and a connection portion for connecting the curtain. The adapter forms an elastic tab, and a pin extends from a distal end of the elastic tab. The first insertion portion is engaged with the second insertion portion, and the pin is aligned with the engaging hole. When the cover slides to an assembly position relative to the bracket, the abutting block is abutted against a side of the elastic tab away from the bracket, to allow the elastic tab to deform toward the bracket, and allow the pin to engage in the engaging hole.

12 Claims, 11 Drawing Sheets

MOUNTING DEVICE FOR A CURTAIN

FIELD OF THE PRESENT INVENTION

The present invention relates to curtain accessories and, more particularly to a mounting device for a curtain.

BACKGROUND OF THE PRESENT INVENTION

In order to fix curtains to external fixtures, such as window frames or walls, current curtains are usually designed with load-bearing components, such as upper beams or covers. In assembly, the bearing members are firstly fixed on the external fixtures, and then the curtains are assembled into the bearing members as a whole.

However, in use, the traditional load-bearing component needs to completely accommodate the curtain, its overall volume is usually relatively large, and the production cost is relatively high, and it is relatively difficult to assemble during assembling, which cannot realize quick disassembly and assembly of the curtain.

SUMMARY OF THE INVENTION

Therefore, the technical problem to be solved by the embodiments of the present invention is to provide a mounting device for a curtain, which can effectively simplify the installation structure of the curtain, and can realize quick disassembly and assembly of the curtain.

To solve the above-mentioned technical problems, an embodiment of the present invention provides the following solutions. A mounting device for a curtain includes a bracket for being fixed to an external fixture, an adapter mounted to the bracket for connecting an end of the curtain, and a cover slidably mounted to a side of the bracket opposite to the curtain, to cover the adapter. The bracket forms a first insertion portion and defines an engaging hole. The adapter forms a second insertion portion, and a connection portion for connecting the end of the curtain. At least one side of the adapter forms an elastic tab, and a pin extends from a distal end of the elastic tab. The first insertion portion is engaged with the second insertion portion, and the pin is aligned with the engaging hole. An inner surface of the cover forms an abutting block, corresponding to the elastic tab. When the cover slides to an assembly position relative to the bracket, the abutting block is abutted against a side of the elastic tab away from the bracket, to allow the elastic tab to deform toward the bracket, thereto allow the pin to engage in the engaging hole.

Furthermore, at least one of the abutting block and the elastic tab forms a first guiding surface, for guiding the elastic deformation of the elastic tab, thereto allow the abutting block to be abutted against the side of the elastic tab opposite to the bracket; the first guiding surface is an inclined surface or an arc surface.

Furthermore, a pressing block extends from the inner surface of the cover, corresponding to the elastic tab, the pressing block and the abutting block are arranged sequentially in a direction in which the cover is slidably assembled relative to the bracket, and the pressing block and the pin are misplaced; when the cover slides out from the assembly position relative to the bracket, after the abutting block is removed from the side of the elastic tab, the pressing block extends through a gap between the elastic tab and the bracket, and presses the elastic tab to allow the pin to completely disengage from the engaging hole.

Furthermore, opposite side surfaces of the pressing block are respectively provided with second guiding surfaces, for guiding the pressing block to extend through the gap; the second guiding surfaces are inclined surfaces or arc surfaces.

Furthermore, the bracket includes a main body in the form of a flat plate, a fixing portion located above the main body to be fixed to the external fixture, and a connecting body for connecting the main body and the fixing portion; the connecting body includes an inclined portion bent from a top side of the main body and slantingly extended away from the adapter, and a parallel plate bent from a distal end of the inclined portion and extended parallel to the main body, the fixing portion extends from a top side of the parallel plate.

Furthermore, the first insertion portion is an insertion tab which extends from a middle of the main body of the bracket toward a bottom end, and there are receiving slots between opposite sides of the insertion portion and the main body; the second insertion portion is an insertion slot defined in a middle of the adapter, the insertion tab is inserted into the insertion slot, and opposite sidewalls bounding the insertion slot are received in the corresponding receiving slots; the main body defines two engaging slots therein, at the opposite sides of the insertion tab.

Furthermore, opposite sides of the parallel plate form two upper positioning tabs, opposite sides of a bottom end of the main body are bent toward the cover to form two lower positioning tabs, located at opposite sides of the insertion tab, and each lower positioning tab includes a connecting part extending from the bottom end of the main body toward the cover, and an insertion part extending from a distal end of the connecting part and parallel to the main body; upper and lower ends of the inner surface of the cover form two upper positioning slots and two lower positioning slots, a top end and a side of each upper positioning slot facing the other upper positioning slot define openings, and a top of each lower positioning slot defines an opening; when the cover slides to the assembly position relative to the bracket, the parallel plate is attached to the inner surface of the cover, the upper positioning tabs are correspondingly inserted into the upper positioning slots through the corresponding openings, and the insertion parts of the lower positioning tabs are correspondingly inserted into the lower positioning slots through the corresponding openings and attached to sidewalls bounding the lower positioning slots away from the inner surface of the cover.

Furthermore, the parallel plate defines a first positioning hole, and a first positioning protrusion extends from the inner surface of the cover, to engage in the first positioning hole.

Furthermore, the mounting device further includes a decorative cover attached to a bottom of the fixing portion to cover the connecting body, the decorative cover includes a top plate fixed below the bottom of the fixing portion, and a side plate covering the connecting body; the fixing portion of the bracket defines a second positioning hole, the inclined portion extends from a middle of the top end of the main body, with two cutouts defined in opposite sides of the end of the main body; a second positioning protrusion extends from a top surface of the top plate of the decorative cover, and two insertion pins extend down from opposite sides of a bottom end of the side plate; the insertion pins of the side plate extend through the cutouts to enter a space between the main body and the cover, and the decorative cover rotates about abutment positions between the insertion pins and the edges of the cutouts, to make the second positioning protrusions to engage in the second positioning holes for positioning.

Furthermore, a raised portion extends from a side of the adapter, and the raised portion defines a screw hole, a screw extends through a through hole defined in the cover and screwed in the screw hole to lock the cover to the adapter.

By adopting the above technical solution, embodiments of the present invention have at least the following beneficial effects. The mounting device is provided with the first insertion portion and the engaging hole on the bracket, the second insertion portion and an elastic tab with the pin on the adapter, and the abutting block on the cover. When assembling, the adapter utilizes the second insertion portion and the first insertion portion on the bracket to be mated with each other to achieve effective positioning with the bracket in all directions except the insertion direction, at the same time makes the pin on the elastic tab aligns with the engaging hole on the bracket, and then, when the cover is slid and assembled on the bracket and covers the adapter, the abutting block on the inner side of the cover will abut against the elastic tab to elastically deform toward the adapter, so that the pin is engaged in and positioned in the engaging hole to ensure that the adapter can no longer be inserted in the direction opposite to the direction in which the adapter and the bracket are inserted. Therefore, the adapter can be firmly assembled on the bracket, and the connection portion provided on the adapter is used for docking with the end of the curtain. When the curtain is installed for the first time, usually the bracket is firstly fixed to the external fixture, and then the adapter is docked with the end of the curtain and then assembled to the bracket. Of course, it is also possible to fix the bracket to the external fixture after assembling the bracket, the adapter, and the end of the curtain respectively. When the curtain needs to be disassembled for maintenance, it is only necessary to firstly slide the cover from the assembly position relative to the bracket. When the bracket slides out from the assembly position, the abutting block gradually disengages from the elastic wing, and the elastic tab, which makes the pin withdraw from the engaging hole under the action of its own elastic force. At this time, the adapter together with the curtain can be pulled out from the bracket. The whole disassembly process is very convenient.

DETAILED DESCRIPTION OF THE PRESENT INVENTION

The present application will be further described in detail below with reference to the accompanying drawings and embodiments. It should be understood that the following illustrative embodiments and illustrations are only used to explain the present invention and are not intended to limit the present invention, and that the embodiments of the present invention and the features of the embodiments can be combined with each other without conflict.

Referring to FIGS. 1-6, an embodiment of the present invention provides a mounting device for a curtain B. The mounting device includes a bracket 1 for being fixed to an external fixture A, an adapter 3 mounted to the bracket 1 for connecting an end of the curtain B, and a cover 5 slidably mounted to a side of the bracket 1 opposite to the curtain B to cover the adapter 3. The bracket 1 forms a first insertion portion 10, and defines at least one engaging hole 12. The adapter 3 forms a second insertion portion 30 and a connection portion 32 for connecting the end of the curtain B. At least one side of the adapter 3 is protruded with an elastic tab 34. A pin 341 extends from a distal end of the elastic tab 34 toward the bracket 1. The first insertion portion 10 of the bracket 1 is engaged in the second insertion portion 30 of the adapter 3, with the pin 341 being aligned with the corresponding engaging hole 12. At least one abutting block 50 extends from an inner surface of the cover 5, corresponding to the corresponding elastic tab 34. When the cover 5 is slid to an assembly position relative to the bracket 1, the abutting block 50 is abutted against a side of the elastic tab 34 away from the bracket 1, to deform the elastic tab 34 toward the bracket 1, thereto allow the pin 341 to engage in the engaging hole 12.

The mounting device of the embodiment is provided with the first insertion portion 10 and the engaging hole 12 on the bracket 1, provided with the second insertion portion 30 and the elastic tab 34 with the pin 341 on the adapter 3, and provided with the abutting block 50 on the cover 5. In assembly, the adapter 3 utilizes the second insertion portion 30 being engaged with the first insertion portion 10 on the bracket 1 to realize effective positioning with the bracket 1 in all directions except the insertion direction of the first insertion portion 10 and the second insertion portion 30. At the same time, the pin 341 on the elastic tab 34 is aligned with the engaging hole 12 on the bracket 1. When the cover 5 is slidably assembled to the bracket 1 to cover the adapter 3, the abutting block 50 on the inner surface of the cover 5 will abut against the side of the elastic tab 34 opposite to the bracket 1, so that the elastic tab 34 is elastically deformed toward the bracket 1, and the pin 341 is pushed forward to be engaged and positioned in the engaging hole 12 to ensure that the adapter 3 can no longer be pulled out along the opposite direction of the insertion direction of the adapter 3 and the bracket 1. Therefore, the adapter 3 is firmly assembled on the bracket 1, and the connection portion 32 of the adapter 3 is used to dock with the end of the curtain B. When installing the curtain B for the first time, the bracket 1 is usually first fixed to the corresponding external fixture A, and then the adapter 3 is docked with the end of the curtain B and then assembled to the bracket 1. Of course, it is also possible to fix the bracket 1 to the corresponding external fixture A after assembling the bracket 1, the adapter 3, and the end of the curtain B. In disassembling the curtain B for maintenance, the cover 5 is slid out from the assembly position relative to the bracket 1, and the abutting block 50 gradually breaks away from abutting against the elastic tab 34, and the elastic tab 34 makes the pin 341 withdraw from the engaging hole 12 under the action of its own elastic force. At the same time, the adapter 3 and the curtain B can be pulled out from the bracket 1, and the whole disassembly process is very convenient.

In specific implementation, it can be understood that the mounting device provided by the embodiments of the present invention are usually adopted in pairs to mount the curtain B, and the two mounting devices realize the installation and positioning of the curtain B from both ends of the curtain B.

Figure 5:
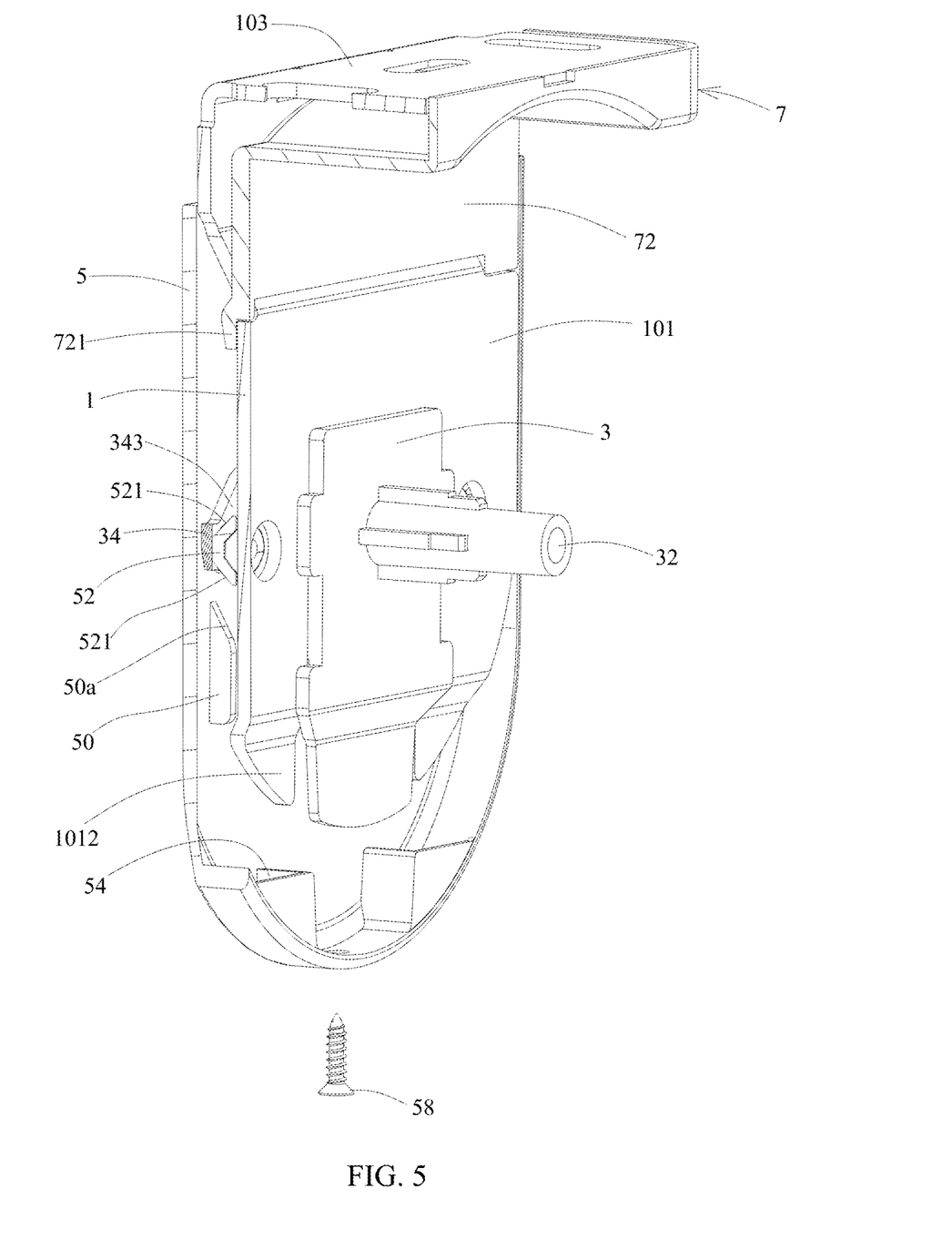
FIG. 5 is a partially cutaway, assembled view of FIG. 1, showing an abutting block of the cover extending through a gap between the adapter and the bracket.
Figure 6:
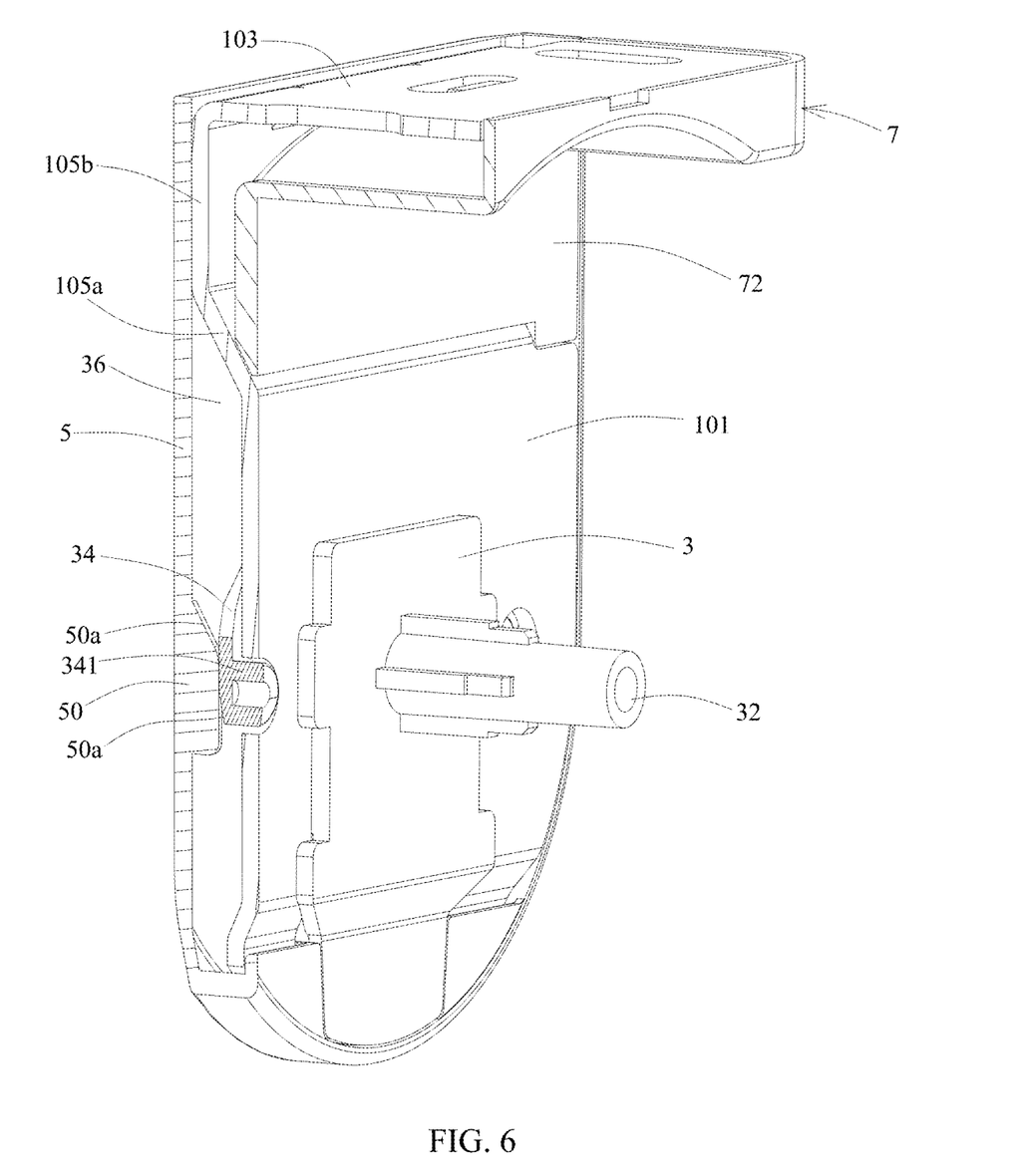
FIG. 6 is a cross-sectional view of FIG. 4, taken along a plane where a central axis of a pin of the adapter is located.
Figure 7:
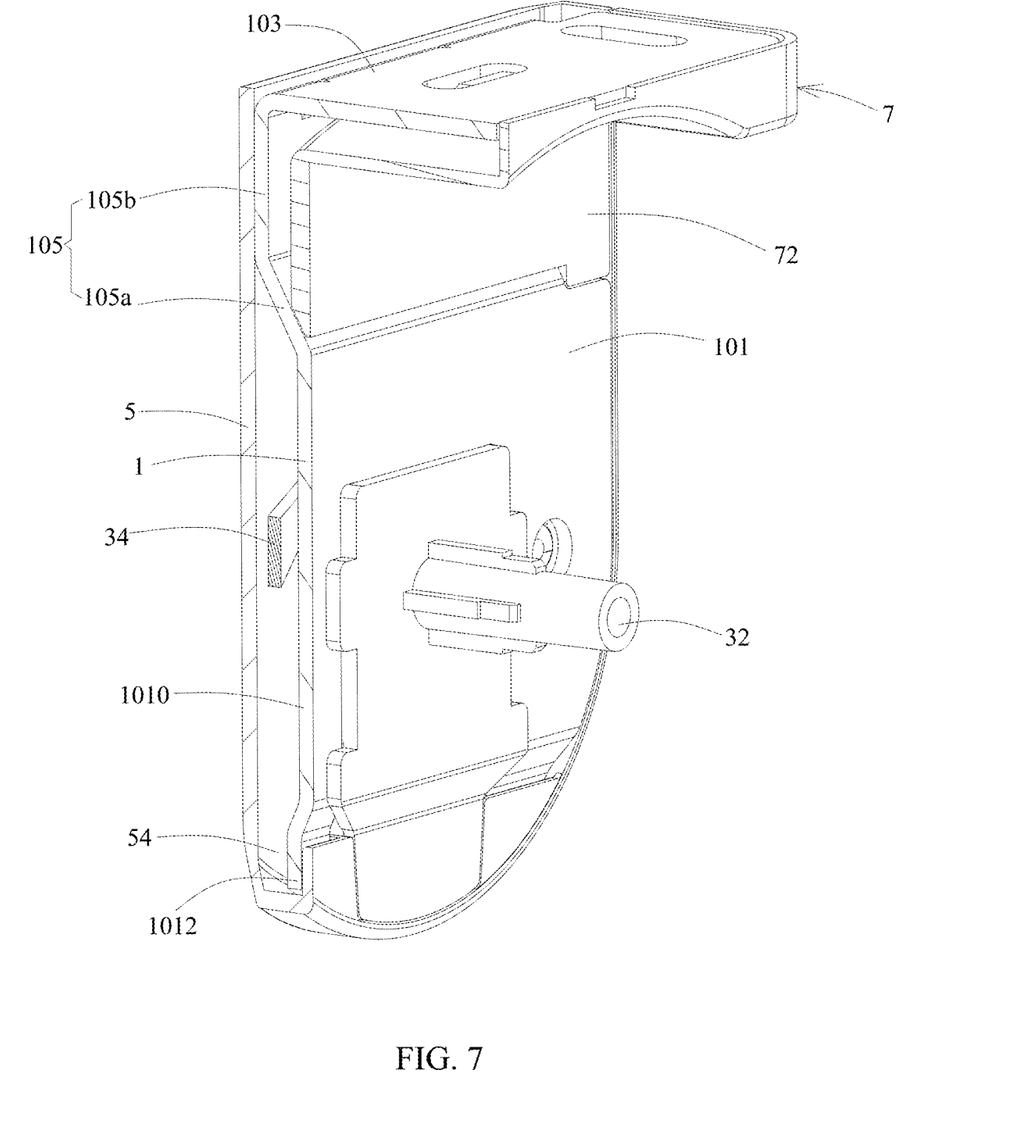
FIG. 7 is another cross-sectional view of FIG. 4, taken along a plane where a central axis of an insertion part of a lower positioning tab of the cover is located.
Figure 9:
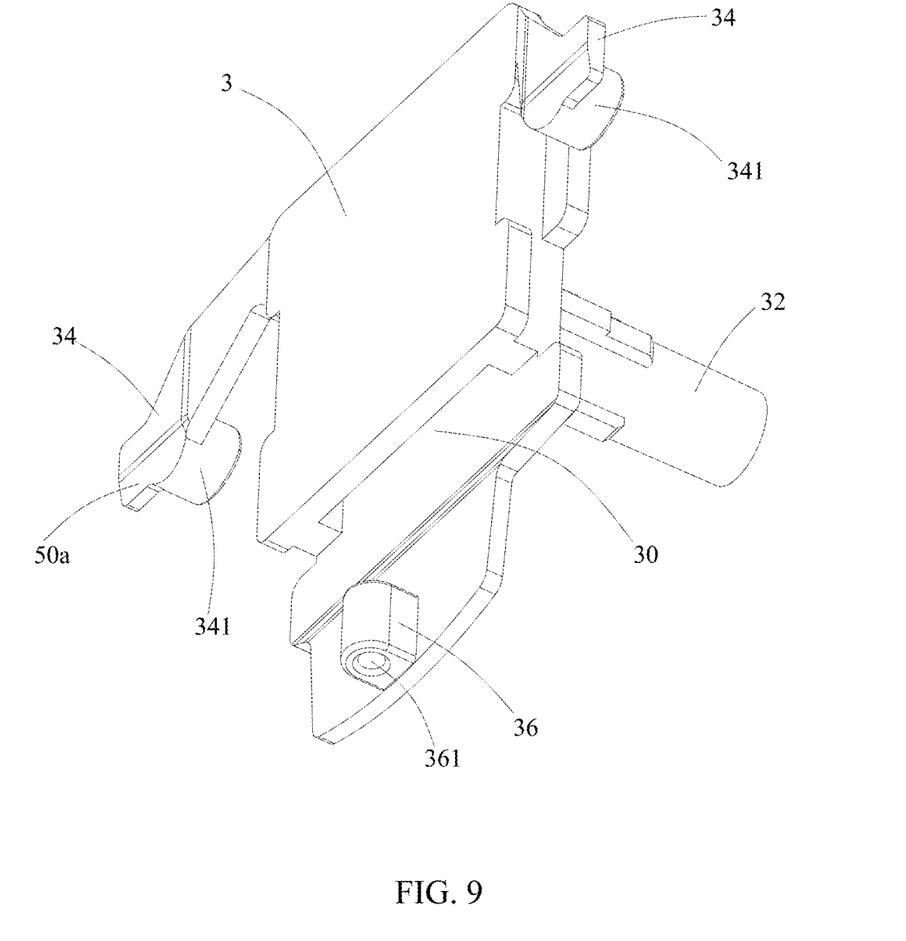
FIG. 9 is an inverted, isometric view of the adapter of FIG. 1.

In an embodiment of the present invention, as shown in FIGS. 5, 6, and 9, at least one of the abutting block 50 and the elastic tab 34 is provided with a first guiding surface 50a, for guiding the elastic deformation of the elastic tab 34, so that the abutting block 50 is correspondingly abutted against the elastic tab 34 away from the bracket 1. The first guiding surface 50a is an inclined surface or an arc surface. In the embodiment, by setting the first guiding surface 50a, the abutting block 50 can be effectively guided to abut against the elastic tab 34 away from the bracket 1, which is more convenient and labor-saving during installation.

In an embodiment of the present invention, as shown in FIGS. 1, 2, 5, and 6, a pressing block 52 extends from the inner surface of the cover 5, corresponding to each elastic tab 34. The pressing block 52 and the abutting block 50 are arranged sequentially in a direction in which the cover 5 is slidably assembled relative to the bracket 1, and the pressing block 52 and the pin 341 are misplaced. When the cover 5 slides out from the assembly position relative to the bracket 1, and after the abutting block 50 is removed from the side of the elastic tab 34, the pressing block 52 extends through a gap 343 between the elastic tab 34 and the bracket 1, and presses the elastic tab 34 to allow the pin 341 to completely disengage from the engaging hole 12. During the long-term use of the mounting device, the elastic tab 34 is abutted by the abutting block 50 for a long time and is in a deformed state. In order to avoid the irreversible deformation of the elastic tab 34 to be difficult to rely on its own elasticity to rebound after long-term use, by setting the pressing block 52 on the inner surface of the cover 5, in the process of removing the cover 5, after the abutting block 50 is separated from the elastic tab 34, the pressing block 52 will slide into the gap 343 between the elastic tab 34 and the bracket 1 to press the elastic tab 34, forcing the pin 341 to completely disengage from the engaging hole 12, thereby realizing the quick disassembly of the cover 5.

In an embodiment of the present invention, as shown in FIG. 5, opposite side surfaces of the pressing block 52 are respectively provided with second guiding surfaces 521, for guiding the pressing block 52 to extend through the gap 343. The second guiding surfaces 521 are inclined surfaces or arc surfaces. In the embodiment, by setting the second guide surfaces 521, the pressing block 52 can be effectively guided to slide into the gap 343 and gradually press the elastic tab 34, so that the process of removing the cover 5 is smoother.

In an embodiment of the present invention, as shown in FIGS. 1, 2, 7, and 8, the bracket 1 includes a main body 101 in the form of a flat plate, a fixing portion 103 located above the main body 101 to be fixed to the external fixture A, and a connecting body 105 for connecting the main body 101 and the fixing portion 103. The connecting body 105 includes an inclined portion 105a bent from a top side of the main body 101 and slantingly extended away from the adapter 3, and a parallel plate 105b bent from a distal end of the inclined portion 105a and extended parallel to the main body 101. The fixing portion 103 extends from a top side of the parallel plate 105b. In the embodiment, the bracket 1 adopts the above-mentioned structural form, and a space between the parallel plate 105b and the inner surface of the cover 5 is defined by using the inclined portion 105a of the connecting body 105 to accommodate the elastic tab 34 of the adapter 3. The cover 5 completely covers the side of the adapter 3 away from the curtain B, and the fixing portion 103 provided on the bracket 1 is also convenient for connection and fixing with the external fixture A. During specific implementation, the fixing portion 103 is usually locked on the external fixture A by using fasteners, such as screws.

In an embodiment of the present invention, as shown in FIGS. 1, 2, and 7-9, the first insertion portion 10 is an insertion tab which extends from a middle of the main body 101 of the bracket 1 toward a bottom end, and there are receiving slots 10a between the opposite sides of the insertion portion 10 and the main body 101. The second insertion portion 30 is an insertion slot 30 defined in a middle of the adapter 3. The insertion tab 10 is inserted into the insertion slot 30. The main body 101 defines two engaging slots 12 therein, at the opposite sides of the insertion tab 10. In the embodiment, the first insertion portion 10 and the second insertion portion 30 adopt insertion tabs and slots that are mated to each other, and the opposite sidewalls bounding the insertion slot are received in the corresponding receiving slots 10a at the opposite sides of the insertion tab 10, which can quickly realize the insertion and the positioning in a direction perpendicular to the insertion direction between the bracket 1 and the adapter 3, so as that relative deflection will not occur between the adapter 3 and the bracket 1.

In an embodiment of the present invention, as shown in FIGS. 1, 2, and 5-9, opposite sides of the parallel plate 105b form two upper positioning tabs 105c. Opposite sides of a bottom end of the main body 101 are bent toward the cover 5 to form two lower positioning tabs 101a, located at opposite sides of the insertion tab 10, and each lower positioning tab 101a includes a connecting part 1010 extending from the bottom end of the main body 101 toward the cover 5, and an insertion part 1012 extending from a distal end of the connecting part 1010 and parallel to the main body 101. Upper and lower ends of the inner surface of the cover 5 form two upper positioning slots 56 and two lower positioning slots 54. A top end and a side of each upper positioning slot 56 facing the other upper positioning slot 56 define openings 56a, and a top of each lower positioning slot 54 defines an opening 54a. When the cover 5 slides to the assembly position relative to the bracket 1, the parallel plate 105b is attached to the inner surface of the cover 5. The upper positioning tabs 105c are correspondingly inserted into the upper positioning slots 56 through the openings 56a, and the insertion parts 1012 of the lower positioning tabs 101a are corresponding inserted into the lower positioning slots 54 through the openings 54a and attached to sidewalls bounding the lower positioning slots 54 away from the inner surface of the cover 5. In the embodiment, the upper positioning tabs 105c of the parallel plate 105b are used to be inserted into and cooperate with the upper positioning slots 56 at the top end of the inner surface of the cover 5, and at the same time, the lower positioning tabs 101a at the bottom end of the inner surface of the main body 101 are used to be inserted into and cooperate with the lower positioning slots 54 of the cover 5, the insertion parts 1012 of the lower positioning tabs 101a are attached to the sidewalls bounding the lower positioning slots 54 away from the inner surface of the cover 5, and the parallel plate 105*b* is attached to the inner surface of the cover 5, so as to realize the positioning of the cover 5 in all directions, and the disassembly and assembly are also convenient.

Figure 1:
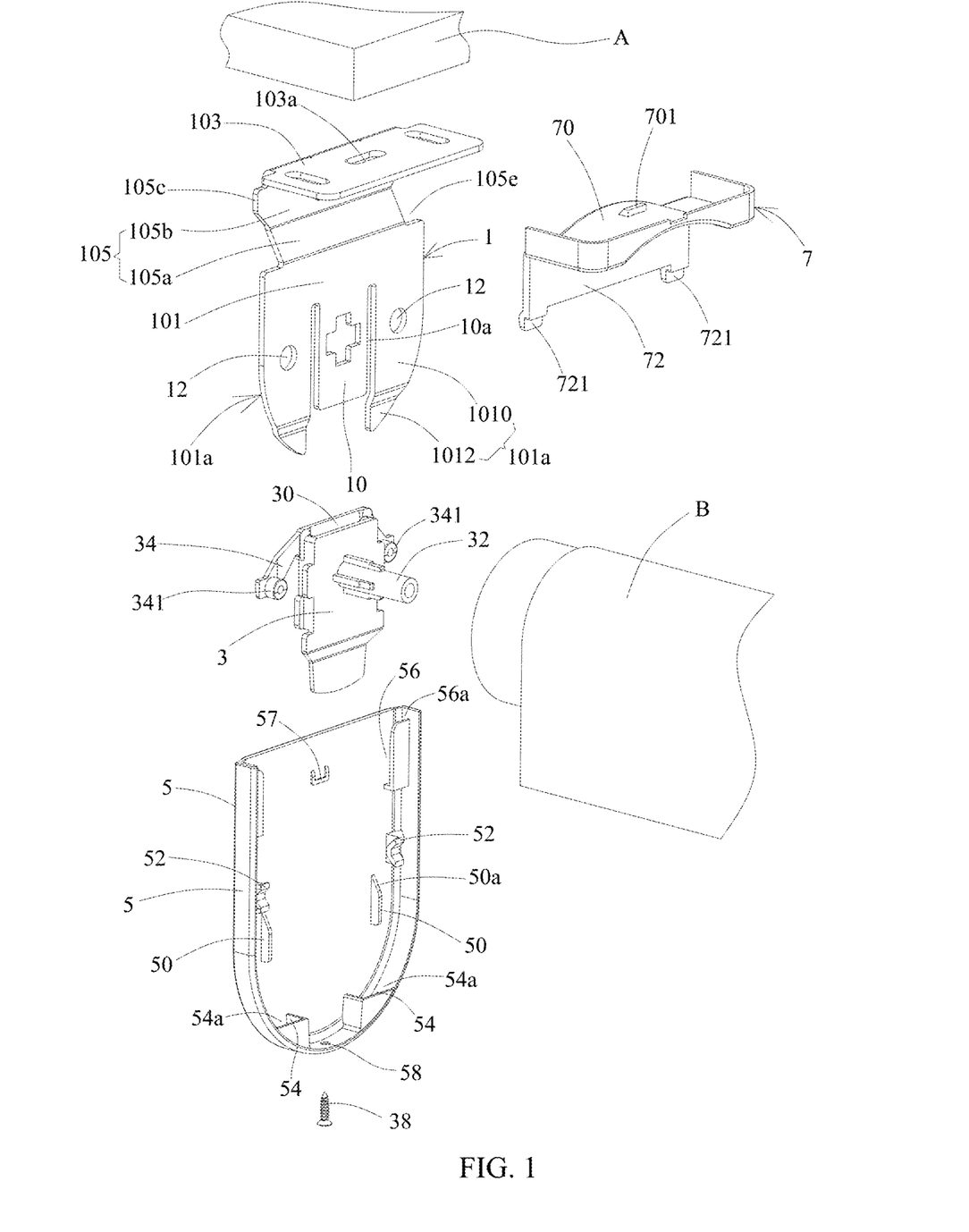
FIG. 1 is an exploded, isometric view of an embodiment of a mounting device for a curtain, wherein the mounting device includes a bracket, an adapter, and a cover.
Figure 2:
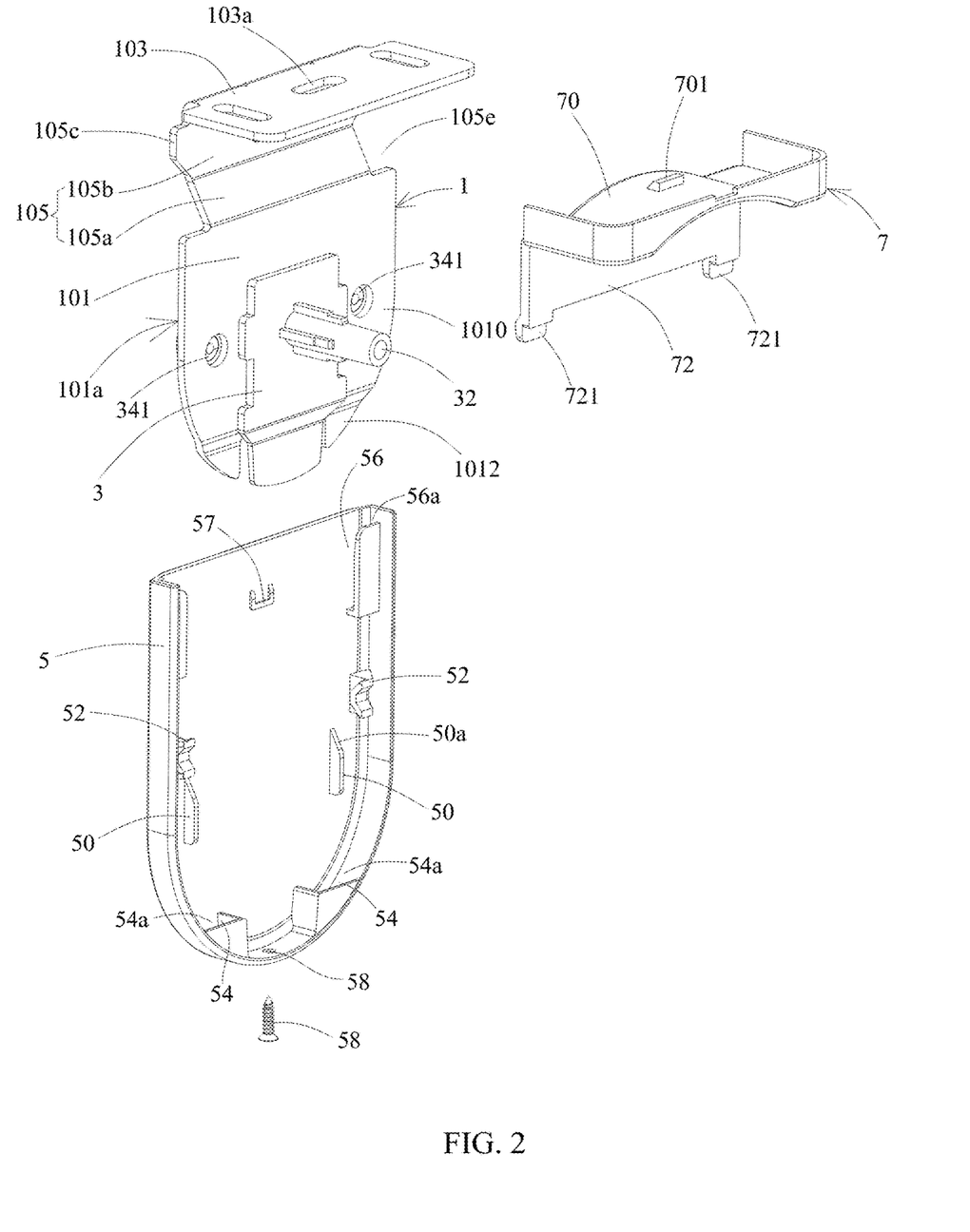
FIG. 2 is a partially assembled view of FIG. 1, showing the adapter being assembled to the bracket.
Figure 3:
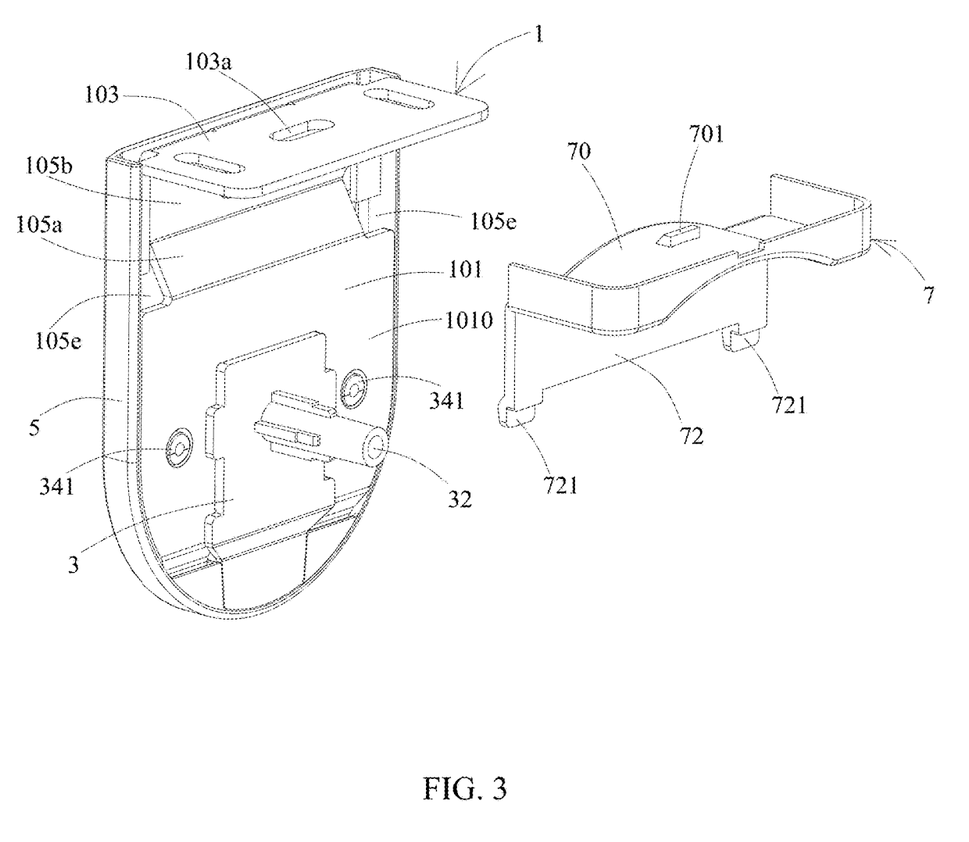
FIG. 3 is another partially assembled view of FIG. 1, showing the adapter and the cover being assembled to the bracket.
Figure 4:
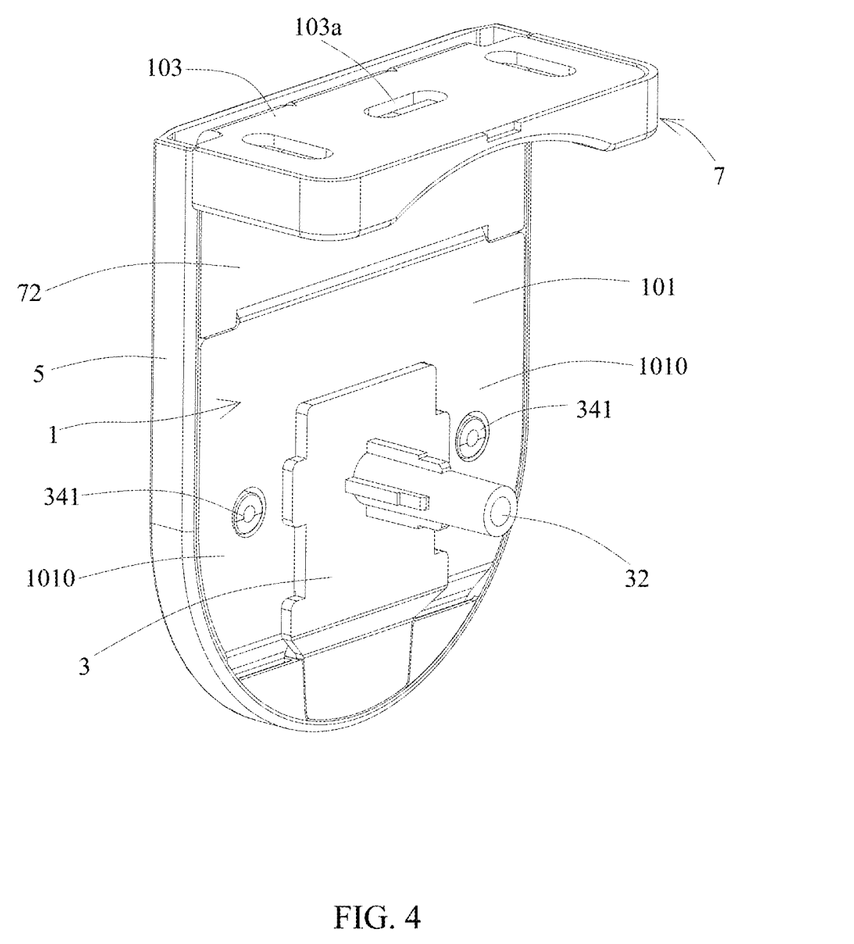
FIG. 4 is an assembled, isometric view of FIG. 3.
Figure 8:
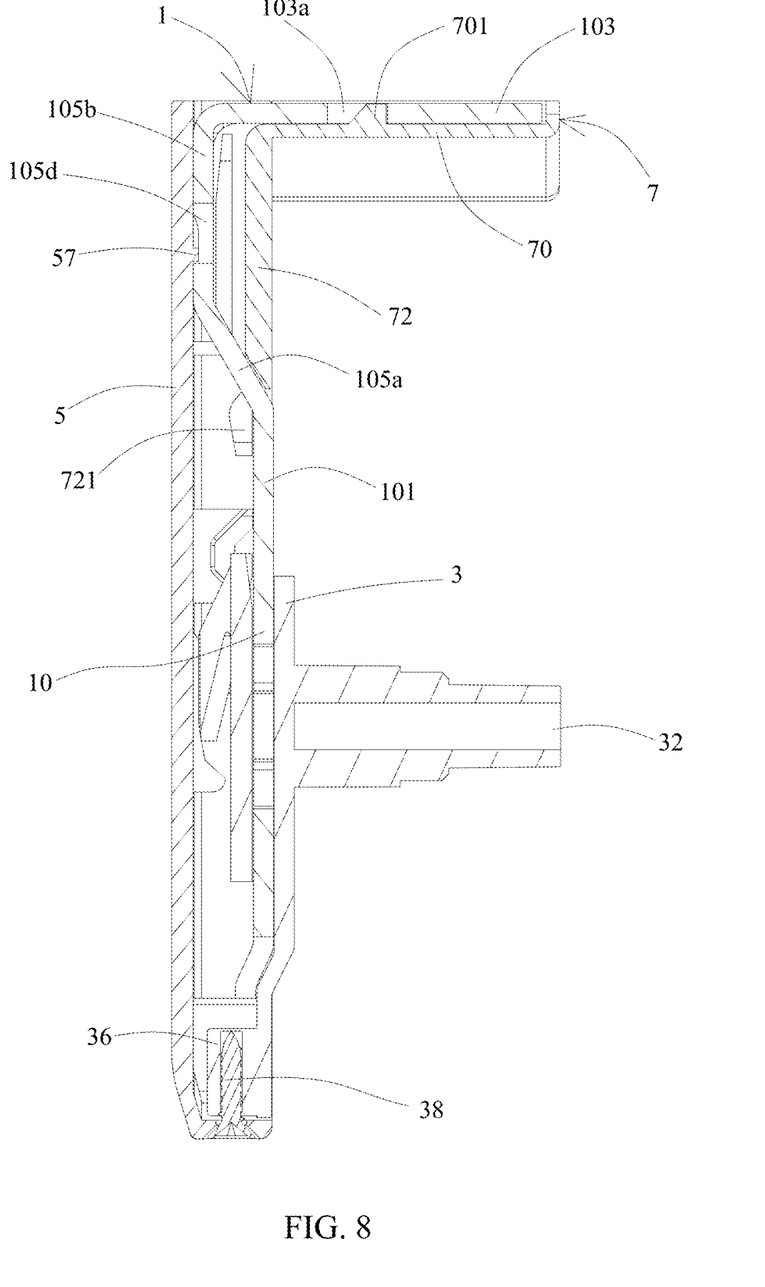
FIG. 8 is another cross-sectional view of FIG. 4, taken along a mid-axis plane in a length direction of the mounting device.

In an embodiment of the present invention, as shown in FIGS. 1, 2, and 8, the parallel plate 105*b* defines a first positioning hole 105*d*. A first positioning protrusion 57 extends from the inner surface of the cover 5, to engage in the first positioning hole 105*d*. In the embodiment, the effective positioning of the cover 5 and the bracket 1 in the sliding direction of the cover 5 relative to the bracket 1 can be realized by using the engagement between the first positioning protrusion 57 and the first positioning hole 105*d*. It is ensured that the cover 5 will not slide accidentally, so that the pressing blocks 52 can be stably abutted against the elastic tabs 34, and the two will not be easily separated.

In an embodiment of the present invention, as shown in FIGS. 1-3, and 8, the mounting device further includes a decorative cover 7 attached to a bottom of the fixing portion 103 to cover the connecting body 105. The decorative cover 7 includes a top plate 70 fixed below the bottom of the fixing portion 103, and a side plate 72 covering the connecting body 105. The fixing portion 103 of the bracket 1 defines a second positioning hole 103*a*. The inclined portion 105*a* extends from a middle of the top end of the main body 101, with two cutouts 105*e* defined in opposite sides of the end of the main body 101. A second positioning protrusion 701 extends from a top surface of the top plate 70 of the decorative cover 7, and two insertion pins 721 extend down from opposite sides of a bottom end of the side plate 72. The insertion pins 721 of the side plate 72 extend through the cutouts 105*e* to enter a space between the main body 101 and the cover 5, and the decorative cover 7 rotates about abutment positions between the insertion pins 721 and the edges of the cutouts 105*e*, to make the second positioning protrusions 701 to engage in the second positioning holes 103*a* for positioning. In the embodiment, by setting the decorative cover 7, the side plate 72 and the top plate 70 of the decorative cover 7 cover the connecting body 105 of the bracket 1, so that most of the structure of the bracket 1 will not be exposed, which can effectively protect the bracket 1. Moreover, by using the insertion pins 721 to extend through the cutouts 105*e*, and at the same time, by using the second positioning protrusions 701 to engage in the second positioning holes 103*a*, the assembly and disassembly of the decorative cover 7 can be realized very simply. In practice, the outer surface of the side plate 72 of the decorative cover 7 can be designed to be flush with the surface of the main body 101 of the bracket 1 adjacent to the side of the curtain B, so that the curtain B can be installed more compactly, and an excessive gap between the curtain B and the mounting device can be avoided.

In an embodiment of the present invention, as shown in FIGS. 1, 2, 8, and 9, a raised portion 36 extends from a side of the adapter 3, and the raised portion 36 defines a screw hole 361. A screw 38 extends through a through hole 58 defined in the cover 5 and screwed in the screw hole 361 to lock the cover 5 to the adapter 3. In practice, the raised portion 36 can be formed on a bottom side of the adapter 3, or formed on a lateral side of the adapter 3 which is convenient for operation, and the cover 5 defines the through hole 58 in a corresponding position. Since the fixing of the cover 5 and the bracket 1 utilizes the elastic insertion of the upper positioning tabs 105*c* and the lower positioning tabs 101*a* with the upper positioning slots 56 and the lower positioning slots 54 and the engagement of the first positioning protrusion 57 and the first positioning hole 105*d*, in order to avoid the elastic deformation of the cover 5 and/or the bracket 1 for a long-term use to make the connection between the cover 5 and the bracket 1 invalid, in the embodiment, the bottom side of the cover 5 is locked to the raised portion 36 of the adapter 3 through the screw 38 extending through the cover 5 to be screwed in the screw hole 361 of the raised portion 36 of the adapter 3, to ensure the stability of the long-term connection.

Figure 10:
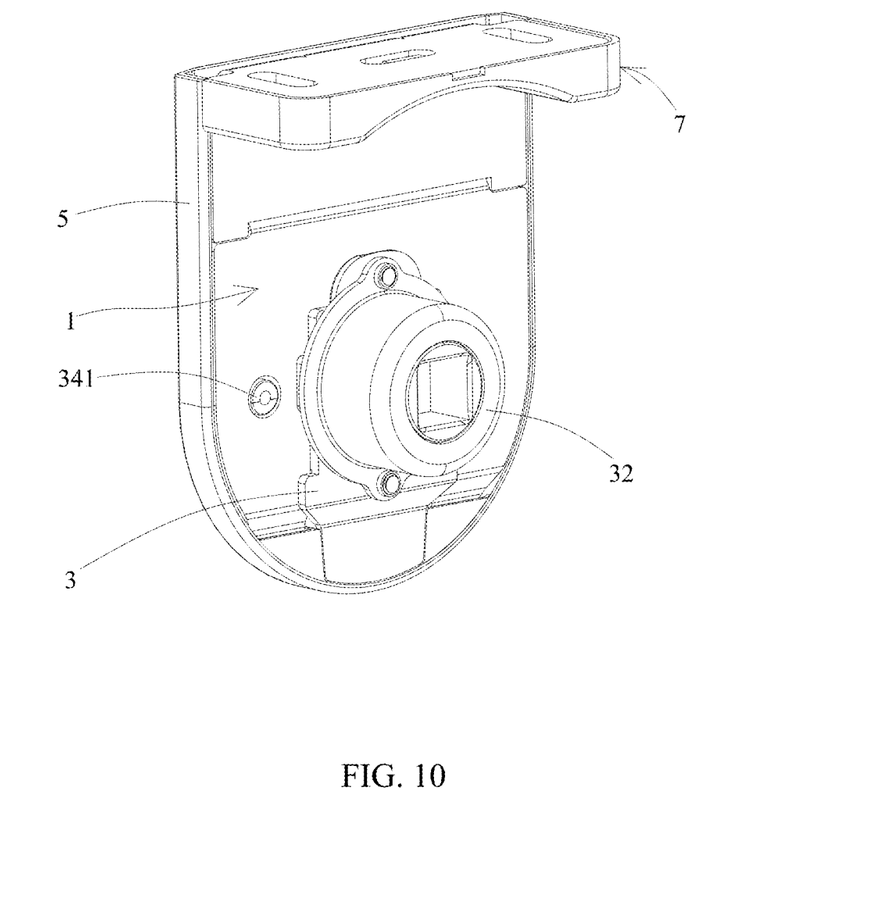
FIG. 10 is an assembled, isometric view of a mounting device for a curtain of another embodiment.
Figure 11:
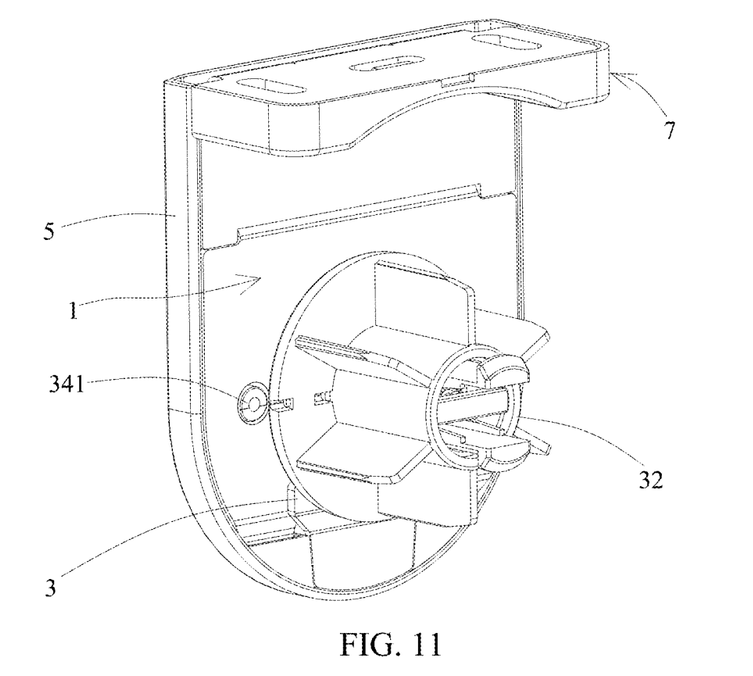
FIG. 11 is an assembled, isometric view of a mounting device for a curtain of another embodiment.

In use, for different types of curtains, such as roller blinds, honeycomb blinds, Roman blinds, etc., the end structures of different curtains are different, so as that the design of the connection portion 32 of the adapter 3 of the embodiments of the present invention has different types, corresponding to the end structures of different curtains, one of which as shown in FIGS. 1-9 is an inner shaft inserted into the end of the curtain, another of which as shown in FIG. 10 is a shaft hole for a shaft of the end of the curtain being inserted into, or another of which as shown in FIG. 11 is an inner support sleeve inserted into an end of a reel of the curtain.

The embodiments of the present invention have been described above with reference to the accompanying drawings, but the present invention is not limited to the specific implementations described above, and the specific implementations described above are only schematic and not limiting. Under the enlightenment of this invention, many forms can be made without departing from the scope of this invention and the scope of protection of the claims, and these are all included in the scope of protection of this invention.

What is claimed is:

1. A mounting device for a curtain, comprising:
a bracket for being fixed to an external fixture, the bracket forming a first insertion portion and defining an engaging hole;
an adapter mounted to the bracket for connecting an end of the curtain, wherein the adapter forms a second insertion portion, and a connection portion for connecting the end of the curtain, at least one side of the adapter forms an elastic tab, a pin extends from a distal end of the elastic tab; wherein the first insertion portion is engaged with the second insertion portion, and the pin is aligned with the engaging hole; and
a cover slidably mounted to a side of the bracket opposite to the curtain, to cover the adapter, wherein an inner surface of the cover forms an abutting block, corresponding to the elastic tab, when the cover slides to an assembly position relative to the bracket, the abutting block is abutted against a side of the elastic tab away from the bracket, to allow the elastic tab to deform toward the bracket, thereto allow the pin to engage in the engaging hole.

2. The mounting device of claim 1, wherein at least one of the abutting block and the elastic tab forms a first guiding surface, for guiding the elastic deformation of the elastic tab, thereto allow the abutting block to be abutted against the side of the elastic tab opposite to the bracket, wherein the first guiding surface is an inclined surface or an arc surface.

3. The mounting device of claim 2, wherein a pressing block extends from the inner surface of the cover, corresponding to the elastic tab, the pressing block and the abutting block are arranged sequentially in a direction in which the cover is slidably assembled relative to the bracket, and the pressing block and the pin are misplaced; wherein when the cover slides out from the assembly position relative to the bracket, and after the abutting block is removed from the side of the elastic tab, the pressing block extends through a gap between the elastic tab and the bracket, and presses the elastic tab to allow the pin to completely disengage from the engaging hole.

4. The mounting device of claim 3, wherein opposite side surfaces of the pressing block are respectively provided with second guiding surfaces, for guiding the pressing block to extend through the gap; the second guiding surfaces are inclined surfaces or arc surfaces.

5. The mounting device of claim 1, wherein a pressing block extends from the inner surface of the cover, corresponding to the elastic tab, the pressing block and the abutting block are arranged sequentially in a direction in which the cover is slidably assembled relative to the bracket, and the pressing block and the pin are misplaced; wherein when the cover slides out from the assembly position relative to the bracket, and after the abutting block is removed from the side of the elastic tab, the pressing block extends through a gap between the elastic tab and the bracket, and presses the elastic tab to allow the pin to completely disengage from the engaging hole.

6. The mounting device of claim 5, wherein opposite side surfaces of the pressing block are respectively provided with second guiding surfaces, for guiding the pressing block to extend through the gap; the second guiding surfaces are inclined surfaces or arc surfaces.

7. The mounting device of claim 1, wherein the bracket comprises a main body in the form of a flat plate, a fixing portion located above the main body to be fixed to the external fixture, and a connecting body for connecting the main body and the fixing portion; wherein the connecting body comprises an inclined portion bent from a top side of the main body and slantingly extended away from the adapter, and a parallel plate bent from a distal end of the inclined portion and extended parallel to the main body, the fixing portion extends from a top side of the parallel plate.

8. The mounting device of claim 7, wherein the first insertion portion is an insertion tab which extends from a middle of the main body of the bracket toward a bottom end, and there are receiving slots defined between opposite sides of the insertion portion and the main body; wherein the second insertion portion is an insertion slot defined in a middle of the adapter, the insertion tab is inserted into the insertion slot, and opposite sidewalls bounding the insertion slot are received in the corresponding receiving slots; the main body defines two engaging slots therein, at the opposite sides of the insertion tab.

9. The mounting device of claim 8, wherein opposite sides of the parallel plate form two upper positioning tabs, opposite sides of a bottom end of the main body are bent toward the cover to form two lower positioning tabs, located at opposite sides of the insertion tab, and each lower positioning tab comprises a connecting part extending from the bottom end of the main body toward the cover, and an insertion part extending from a distal end of the connecting part and parallel to the main body; wherein upper and lower ends of the inner surface of the cover form two upper positioning slots and two lower positioning slots, a top end and a side of each upper positioning slot facing the other upper positioning slot define openings, and a top of each lower positioning slot defines an opening; wherein when the cover slides to the assembly position relative to the bracket, the parallel plate is attached to the inner surface of the cover, the upper positioning tabs are correspondingly inserted into the upper positioning slots through the corresponding openings, and the insertion parts of the lower positioning tabs are correspondingly inserted into the lower positioning slots through the corresponding openings and attached to sidewalls bounding the lower positioning slots away from the inner surface of the cover.

10. The mounting device of claim 7, wherein the parallel plate defines a first positioning hole, and a first positioning protrusion extends from the inner surface of the cover, to engage in the first positioning hole.

11. The mounting device of claim 7, further comprising a decorative cover attached to a bottom of the fixing portion to cover the connecting body, wherein the decorative cover comprises a top plate fixed below the bottom of the fixing portion, and a side plate covering the connecting body; the fixing portion of the bracket defines a second positioning hole, the inclined portion extends from a middle of the top end of the main body, with two cutouts defined in opposite sides of the end of the main body; a second positioning protrusion extends from a top surface of the top plate of the decorative cover, and two insertion pins extend down from opposite sides of a bottom end of the side plate; wherein the insertion pins of the side plate extend through the cutouts to enter a space between the main body and the cover, and the decorative cover rotates about abutment positions between the insertion pins and edges bounding the cutouts, to make the second positioning protrusions to engage in the second positioning holes for positioning.

12. The mounting device of claim 1, wherein a raised portion extends from a side of the adapter, and the raised portion defines a screw hole, a screw extends through a through hole defined in the cover and screwed in the screw hole to lock the cover to the adapter.

* * * * *